United States Patent
Weatherston

[15] 3,677,335
[45] July 18, 1972

[54] STAGED HEATING AND COOLING SYSTEM

[72] Inventor: Richard N. Weatherston, St. Paul, Minn.
[73] Assignee: Weather-Rite Inc., St. Paul, Minn.
[22] Filed: Jan. 28, 1971
[21] Appl. No.: 110,526

[52] U.S. Cl. ................................. 165/12, 165/26, 307/39
[51] Int. Cl. ................................................. F25b 29/00
[58] Field of Search .................. 165/12, 26, 27; 307/39; 235/157.3

[56] References Cited

UNITED STATES PATENTS

| | | | |
|---|---|---|---|
| 3,305,000 | 2/1967 | Bullen et al. | 165/12 |
| 3,450,343 | 6/1969 | Donath | 307/39 |

Primary Examiner—Charles Sukalo
Attorney—Robert M. Dunning

[57] ABSTRACT

A control system for a heating and cooling system in which the amount of heating and the amount of cooling are both controlled in timed incremental stages by means of a signal from an up-down electronic counter which operates to call for the next successive stage at timed intervals in accordance with an electronic clock.

8 Claims, 1 Drawing Figure

Patented July 18, 1972 3,677,335
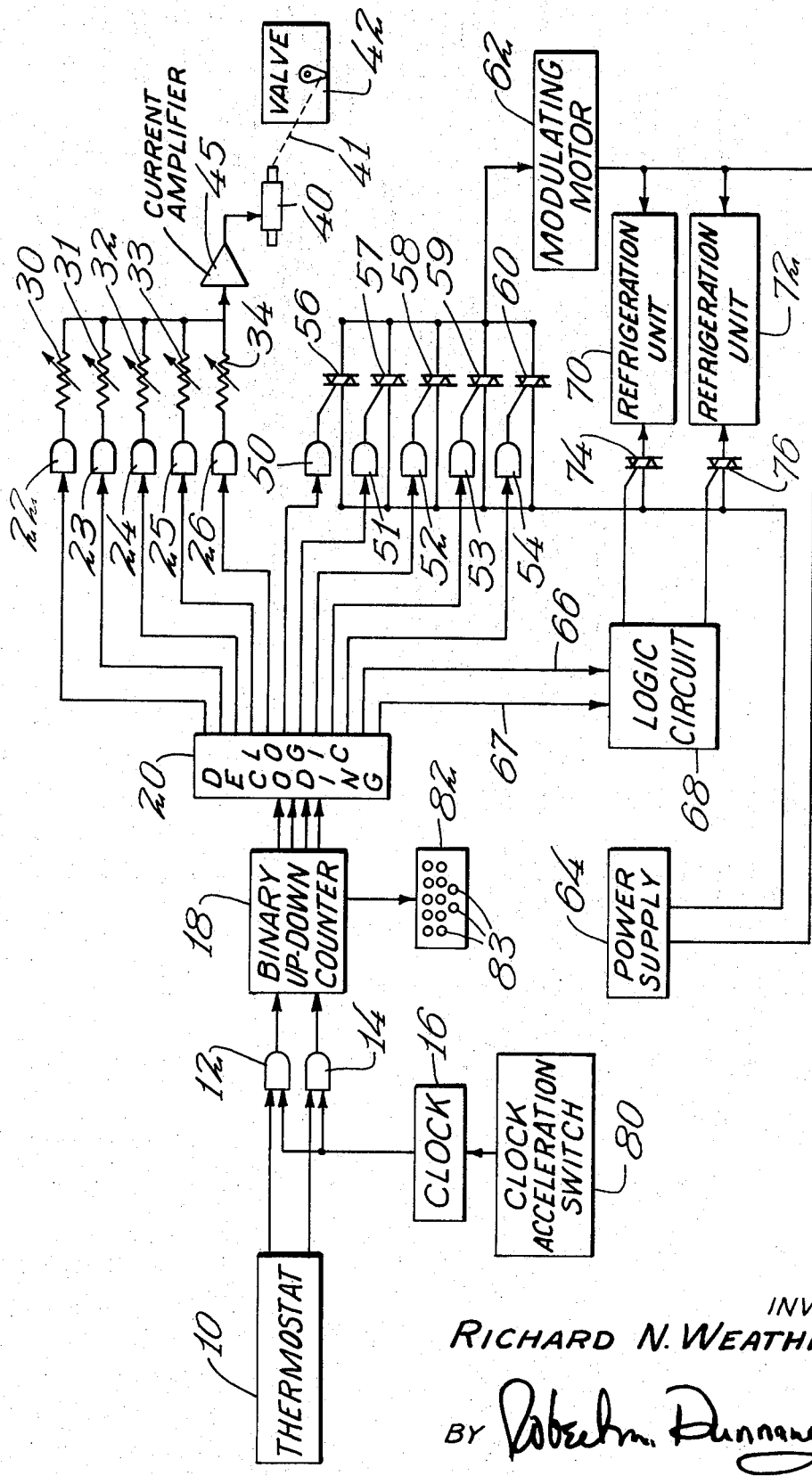
INVENTOR
RICHARD N. WEATHERSTON
BY Robert M. Dunnang
ATTORNEY

STAGED HEATING AND COOLING SYSTEM

BACKGROUND OF THE INVENTION

In the prior art many control systems have been used for keeping certain controllable factors at a predetermined level. Things that have been controlled include room temperature, water level, pressure, speed and mixtures. Of particular interest in this application is the control of room temperature by heating, air conditioning, and the supplying of outside air to the room. Prior art systems have generally relied upon simple thermostats which can call for either heating or cooling. Systems of this type are not capable of adjusting quickly to radical changes in heating and cooling requirements because they must be designed to respond slowly. If they are designed to respond quickly and provide a great deal of heat or a great deal of cooling upon demand they will overshoot the predetermined temperature level thus causing severe oscillations about the desired temperature. This is very undesirable and, therefore, prior art heating and cooling systems have been designed to respond rather slowly to changing temperatures in order to avoid at least partially this oscillation problem. The present invention however can respond very quickly to radical changes and also can respond in very slow small increments to small changes as described below.

SUMMARY OF THE INVENTION

My invention is described herein with respect to heating and air conditioning systems. However, it should be understood that the generalized control system described is applicable to the control of a wide variety of other factors such as water level, water temperature, pressure, mixture, speed and the like. Thus, I do not intend to limit the invention to the particular arrangement shown in which the preferred embodiment has been built as a portion of a heating and air conditioning system.

Briefly, my invention contemplates controlling the heating in a plurality of stages each of which is independent and may be separately adjusted to a predetermined level. Likewise, the provision of cooling air from outside is provided in a plurality of stages and the air conditioning is provided in a plurality of successive stages. As the thermostat calls for either heating or cooling an electronic counter progresses from one stage to the next at a relatively slow controlled rate in accordance with an electronic clock providing successively more heat or more cooling in accordance with the requirements of the thermostat. However, the particular stage in operation can be monitored manually and if a sudden change in mode is desired for any reason such as servicing or changes in temperature the clock can be manually accelerated so as to cycle quickly from a maximum heating to a maximum cooling condition or vice versa. Thus, it may be seen that it is an object of my invention to provide an improved control system. It is a further object of the present invention to provide a low cost control system capable of responding slowly so as to compensate for time lag in the factor sensing and monitoring system and also capable of changing very quickly if desired. Further objects and advantages will become apparent upon consideration of the following description and drawings.

BRIEF DESCRIPTION OF THE DRAWINGS

In the drawing a schematic circuit is presented showing how five stages of heating, five stages of outside air cooling, and two stages of refrigeration can all be successively or individually selected by a digital electronic control system so as to permit both slow and fast changes in heating and cooling.

DESCRIPTION OF THE PREFERRED EMBODIMENT

In the drawing a thermostat 10 is shown which may comprise any of a variety of types well know to those skilled in the art for measuring the temperature of a room and signaling either for more heat or more cooling. The signals calling for more heat or more cooling are transmitted from thermostat 10 to a pair of gates 12 and 14 which are caused to periodically open by a clock 16 which generates a short pulse at appropriate intervals depending upon the amount of lag time experienced in measuring the temperature of the room. When the clock pulse signal is transmitted by clock 16 gates 12 and 14 are opened. If thermostat 10 is calling for more heat a signal is transmitted by gate 12 to a binary up-down counter 18. If thermostat 10 is calling for more cooling a signal is transmitted from gate 14 to the up-down counter. Depending upon which gate is in operation up-down counter 18 is pulsed upwards or downwards one count corresponding to more or less heating. This binary count is transmitted to decoding logic 20 which may comprise, for example, a one in 16 decoder. Decoding logic 20 interprets the binary number from up-down counter 18 and transmits a signal on one of 12 outgoing leads. The upper five of these leads go to a series of five invertor gates numbered 22 through 26 which are connected to a series of adjustable resistances numbered 30 through 34.

Invertor gates have the usefull characteristic of supplying DC current upon demand which can be easily regulated so that the present control system is readily adaptable to any set of actuators which one might care to control. Variable resistors 30 through 34 are adjusted to pass five successive levels of current from the invertors which currents are amplified by a current amplifier 45 and presented to a solonoid 40. Solonoid 40 operates a valve 42 by means of a mechanical connection shown as a dashed line 41 so as to provide more or less gas to a heating furnace. Solonoid 40 and valve 42 are, of course, exemplary only and any of a large variety of electro-mechanical or electronic devices could be substituted therefor. The important consideration is that some mechanism be provided for adjusting the amount of heat produced by the heating system in accordance with the current level being received from invertor gates 22 through 26. For example, if the amount of heat is being controlled by a signal from invertor gate 25 and thermostat 10 calls for still additional heat the cycle operates as follows: when clock 16 produces the next pulse (which could be spaced, for example, at two minute intervals) gate 12 is activated so as to trigger up-down counter 18 to count up one stage. The new binary number from counter 18 is decoded by decoding logic 20 and invertor gate 25 is deactivated while invertor gate 24 is activated. Variable resistance 32 is adjusted to provide a somewhat higher current than variable resistance 33. This current is amplified and solonoid 40 is caused to pull a little bit harder opening valve 42 a little bit more. In the same manner if thermostat 10 starts to call for more cooling the up-down counter 18 counts down, one stage every clock pulse, until the room is cool enough or until all of the invertor gates 22 through 26 are off and decoding logic 20 starts activating invertor gates 50 through 54 in successive stages. Invertor gates 50 through 54 are connected to a series of five triac gates 56 through 60 which are well known to those skilled in the art. Triac gates have the capability of handling varying amounts of alternating current so as to perform a function similar to the variable resistances 30 through 34. Thus, AC power from power supply 64 may be directed through triac gates 56 to 60 to a modulating motor 62 which can operate to open, for example, several dampers allowing cooling air to be brought in from outside the building. If invertor gate 51 is operating and holding triac 57 open, a certain amount of fresh air will be entering the building for cooling purposes. If this is insufficient thermostat 10 continues calling for additional cooling and at the next clock pulse from clock 16 causes up-down counter 18 to count down one unit or stage which activates invertor gate 52 and triac gate 58. Gate 58 is chosen to permit more alternating current to pass than gate 57 so as to cause modulating motor 52 to open the dampers still further. It may prove impossible to cool the building sufficiently with outside air in which event counter 18 continues to stage downward for cooler and cooler conditions until an output is generated on lead 66 to a logic circuit 68. Logic circuit 68 operates in response to a signal on lead 66 to turn on a first refrigeration unit 70 by activating a triac gate 74. This refrigeration unit may provide enough cooling to make the building comfortable. If not thermostat 10 calls for additional cooling and counter 18 counts down still one more stage so that decoding logic 20 presents a signal on lead 67. Logic circuit 68 is designed to respond to a signal on lead 67 by activating both triac gates 74 and 76 so as to activate simultaneously the first refrigeration unit 70 and the second refrigeration unit 72 thus providing maximum air conditioning. Of course, additional refrigeration units could be provided as necessary and the particular number of heating and cooling stages can be adjusted as desired. The capacity of up-down counter 18 and decoding logic 20 can be adjusted upward or downward to handle any size system desired.

As up-down counter 18 counts upward or downward the particular stage in operation is monitored by an indicator box 82 which has a series of 12 lights 83 on it which represent respectively the five heating, five cooling and two refrigeration stages. The particular light glowing indicates which stage is in operation. In order to make a fast change from cooling to heating or from heating to cooling the operator need only note the particular stage in operation by reference to indicator box 82 and then activate a clock acceleration switch 80 which serves to speed up clock 16 so as to cycle quickly through the various stages. The operator can thus accelerate the clock until indicator box 82 indicates that the desired stage is in operation and then allow the system to return to its normal mode of operation. Thus I have provided a control system which can adjust in gradual stages and not over run the predetermined temperature level, or which can adjust very quickly to radical changes in temperature. The particular components such as the triac gates, the invertor gates, the variable resistances, and the logic circuits are exemplary only and various changes could be made to these components without departing from the spirit and scope of the invention. Thus, the following claims are intended to cover only the control system involved in switching through successive stages in a digital fashion to achieve different levels of control in combination with the ability to change the speed of switching as desired.

I claim:

1. A staged control system for a heating and cooling system comprising in combination:
    adjustable heating means;
    a plurality of first actuating means connected to actuate said heating means, each of said first actuating means being adjustable to provide a varying degree of actuation of said heating means;
    adjustable cooling means;
    a plurality of second actuating means connected to said cooling means, each of said second actuating means being adjustable to provide a varying degree of actuation of said cooling means;
    adjustable refrigeration means;
    a plurality of third actuating means connected to said refrigeration means, each of said third actuating means being adjustable to provide a varying degree of actuation of said refrigeration means;
    timed counting means connected to said first, second, and third actuating means operable to activate each of said plurality of actuating means independently and successively; and
    temperature sensing means connected to cause said counting means to count and activate toward cooler actuating means in response to temperatures above a predetermined level and toward warmer actuating means in response to temperatures below the predetermined level.

2. The apparatus of claim 1 in which said timed counting means comprises an up-down counter coupled with a clock means so as to count and switch actuating means at a predetermined rate.

3. The apparatus of claim 2 in which said temperature sensing means comprises a thermostat connected to said counter through electronic gates which are controlled also by said clock means.

4. The apparatus of claim 3 including means to monitor the count on said counter and means to speed up the clock means rate.

5. The apparatus of claim 4 in which at least some of said actuating means include adjustable resistances.

6. The apparatus of claim 4 in which at least some of said actuating means include triac gates.

7. The apparatus of claim 5 in which at least some of said actuating means include triac gates.

8. The apparatus of claim 7 in which said counter comprises a binary up-down counter in conjunction with decoding logic, said decoding logic having a plurality of separate outputs connected to activate each of said first, second, and third actuating means.

* * * * *